US010982017B2

(12) United States Patent
Zou et al.

(10) Patent No.: US 10,982,017 B2
(45) Date of Patent: Apr. 20, 2021

(54) METHODS OF MANUFACTURING POLYOLEFIN DRAG REDUCING AGENTS

(71) Applicants: Jian Zou, Sugar Land, TX (US); David J. Jurek, Katy, TX (US); Brandon M. Vittur, Sugar Land, TX (US); Anthony D. Bravo, Bixby, OK (US)

(72) Inventors: Jian Zou, Sugar Land, TX (US); David J. Jurek, Katy, TX (US); Brandon M. Vittur, Sugar Land, TX (US); Anthony D. Bravo, Bixby, OK (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 46 days.

(21) Appl. No.: 16/441,266

(22) Filed: Jun. 14, 2019

(65) Prior Publication Data
US 2019/0382511 A1 Dec. 19, 2019

Related U.S. Application Data

(60) Provisional application No. 62/686,150, filed on Jun. 18, 2018.

(51) Int. Cl.
| *C08F 2/01* | (2006.01) |
| *C08F 2/02* | (2006.01) |
| *C08F 6/26* | (2006.01) |
| *C08L 23/08* | (2006.01) |
| *C08L 39/06* | (2006.01) |
| *C08L 71/02* | (2006.01) |
| *C08F 10/00* | (2006.01) |
| *C08L 29/04* | (2006.01) |
| *C08J 3/12* | (2006.01) |
| *F17D 1/16* | (2006.01) |

(52) U.S. Cl.
CPC .............. *C08F 2/01* (2013.01); *C08F 2/02* (2013.01); *C08F 6/26* (2013.01); *C08F 10/00* (2013.01); *C08L 23/0853* (2013.01); *C08L 29/04* (2013.01); *C08L 39/06* (2013.01); *C08L 71/02* (2013.01); *C08J 3/12* (2013.01); *F17D 1/16* (2013.01)

(58) Field of Classification Search
USPC ............................................ 523/175; 137/13
See application file for complete search history.

(56) References Cited

U.S. PATENT DOCUMENTS

| 4,340,076 | A | 7/1982 | Weitzen |
| 4,518,757 | A | 5/1985 | Schulz et al. |
| 4,720,397 | A | 1/1988 | O'Mara et al. |
| 5,126,070 | A | 6/1992 | Leifheit et al. |
| 5,323,906 | A | 6/1994 | Gouge et al. |
| 5,341,932 | A | 8/1994 | Chen et al. |
| 5,449,732 | A | 9/1995 | Smith et al. |
| 5,504,132 | A | 4/1996 | Smith et al. |
| 6,126,872 | A | 10/2000 | Kommareddi et al. |
| 6,160,036 | A | 12/2000 | Kommareddi et al. |
| 6,649,670 | B1 | 11/2003 | Harris et al. |
| 6,841,593 | B2 | 1/2005 | Kommareddi et al. |
| 6,946,500 | B2* | 9/2005 | Harris ............ C08J 3/124 523/175 |
| 7,119,132 | B2* | 10/2006 | Harris ............ C08F 2/002 523/175 |
| 7,592,379 | B2 | 9/2009 | Liu et al. |
| 9,074,024 | B2* | 7/2015 | Nesyn ............ C10L 10/00 |
| 2004/0132883 | A1 | 7/2004 | Harris et al. |
| 2008/0064785 | A1 | 3/2008 | Martin et al. |
| 2014/0238889 | A1 | 8/2014 | Sunder et al. |
| 2014/0356603 | A1 | 12/2014 | Kumar et al. |
| 2017/0156999 | A1 | 6/2017 | Harris et al. |

FOREIGN PATENT DOCUMENTS

| CA | 2247100 C | 7/2007 |
| CN | 2603034 Y | 2/2004 |
| CN | 107325379 A | 11/2017 |
| DE | 4244729 A1 | 5/1994 |

(Continued)

OTHER PUBLICATIONS

Hartmann et al. "Water-Soluble Firls for Agrochemicals", Dec. 31, 2014; 4 pages, with English abstract.
International Serach Report for International Application No. PCT/US2019/037139, International Filing Date Jun. 14, 2019, dated Oct. 11, 2020, 3 pages.
M. A. Kelland, "Production Chemicals for the Oil and Gas Industry", 2nd edition, CRC Press, 2014, pp. 375-383.
Oberlerchner et al., "Overview of Methods for the Direct Molar Mass Determination of Cellulose"; Molecules 2015; 20, 10313-10341; www.mdpi.com/journal/molecules; 29 pages.
Written Opinion for International Application No. PCT/US2019/037139, International Filing Date Jun. 14, 2019, dated Oct. 11, 2020, 3 pages.

(Continued)

*Primary Examiner* — Fred M Teskin
(74) *Attorney, Agent, or Firm* — Cantor Colburn LLP

(57) ABSTRACT

A process of manufacturing a polyolefin drag reducing agent comprises: injecting a catalyst and a drag reducing agent forming component comprising (i) at least one olefin monomer, or (ii) at least one olefin oligomer, or a combination of (i) and (ii) into a temporary container comprising a container material, sealing the temporary container; allowing the drag reducing agent forming component to polymerize in the sealed temporary container to form the polyolefin drag reducing agent; and at least partially dissolving the container material. The container material includes an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene glycol, a polysaccharide or its derivative, or a combination comprising at least one of the foregoing, provided that when the container material comprises polyvinyl acetate or polyvinyl alcohol, the temporary container is coated or has two or more layers.

22 Claims, 3 Drawing Sheets

(56) References Cited

FOREIGN PATENT DOCUMENTS

| EP | 1578804 A1 | 9/2005 |
|---|---|---|
| JP | 0240254 A | 2/1990 |
| WO | 2017189322 A1 | 11/2017 |
| WO | 2017216827 A1 | 12/2017 |

OTHER PUBLICATIONS

Yacob et al., "Determination of Viscosity-Average Molecular Weight of Chitosan Using Intrinsic Viscosity Measurement"; Malaysian Nuclear Agency, Bangi, 4 pages.

* cited by examiner

METHODS OF MANUFACTURING POLYOLEFIN DRAG REDUCING AGENTS

CROSS REFERENCE TO RELATED APPLICATIONS

This application claims the benefit of U.S. Provisional Application Ser. No. 62/686,150, filed Jun. 18, 2018, the disclosure of which is incorporated herein by reference in its entirety.

BACKGROUND

Drag reducing agents (DRA) are additives used to reduce the drag of a fluid flowing through a conduit. In the oil and gas industry, the use of drag reducing agents to reduce the drag of a hydrocarbon flowing through a pipeline, and hence to reduce the energy required for such hydrocarbon transportation, is well known. Effective drag reducing agents include non-crystalline, high molecular weight polyolefins. One process of manufacturing high molecular weight polyolefin drag reducing agents is to polymerize an olefin monomer in the presence of a catalyst in a sealed container formed of polyethylene. The formed polyolefin polymer and the container are then ground together to produce particulate drag reducing agents. However, the process can be cumbersome as the container material often needs to be physically removed before or after grinding. In addition, many catalysts are sensitive to oxygen and moisture, thus the sealed container needs to be placed in an inert environment to prevent oxygen and moisture from entering the container to prematurely terminate the polymerization reaction. Accordingly, there is a need in the art for alternative processes that are effective and efficient to manufacture polyolefin drag reducing agents.

BRIEF DESCRIPTION

A process of manufacturing a polyolefin drag reducing agent is disclosed. The process comprises injecting a catalyst and a drag reducing agent forming component comprising (i) at least one olefin monomer, or (ii) at least one olefin oligomer, or a combination of (i) and (ii) into a temporary container comprising a container material, which includes an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene glycol, a polysaccharide or its derivative, or a combination comprising at least one of the foregoing; sealing the temporary container; allowing the drag reducing agent forming component to polymerize in the sealed temporary container to form the polyolefin drag reducing agent; and at least partially dissolving the container material with a polar solvent that selectively dissolves the container material but not the polyolefin drag reducing agent, provided that when the container material comprises polyvinyl acetate or polyvinyl alcohol, the temporary container is coated or has two or more layers.

Another process of manufacturing an olefin drag reducing agent comprises continuously forming a temporary container from a container material comprising an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene glycol, a polysaccharide or its derivative, or a combination comprising at least one of the foregoing; injecting a catalyst and drag reducing agent forming component into the temporary container, the drag reducing agent forming component comprising (i) at least one olefin monomer, or (ii) at least one olefin oligomer, or a combination of (i) and (ii); sealing the temporary container; placing the sealed temporary container in a heat transfer fluid or a circulated gas environment at −100° C. to 100° C. for about 0.1 hour to about 200 hours to allow the drag reducing agent forming component to polymerize in the sealed temporary container forming the polyolefin drag reducing agent; removing the sealed temporary container from the heat transfer fluid; grinding the polyolefin drag reducing agent to produce a particulate polyolefin drag reducing agent; dispersing the particulate polyolefin drag reducing agent in a dispersing fluid, and at least partially dissolving the container material with a polar solvent that selectively dissolves the container material but not the polyolefin drag reducing agent after the polyolefin drag reducing agent is formed; provided that when the container material comprises polyvinyl acetate or polyvinyl alcohol, the temporary container is coated or has two or more layers.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
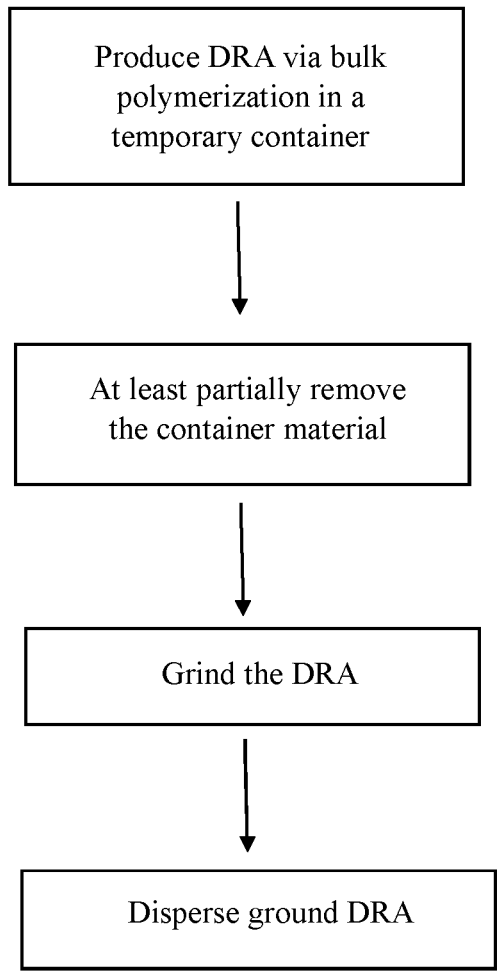
FIG. 1 is a process diagram showing an exemplary process of making a polyolefin drag reducing agent (DRA) where the container material is at least partially dissolved before grinding.

The inventors have discovered a process that uses a dissolvable temporary container as a reaction vessel to make polyolefin drag reducing agents. The temporary container can be conveniently and continuously formed from a container material. Advantageously, the container material can be selected to be an excellent oxygen and/or moisture barrier. To further tune its oxygen and/or moisture barrier performance, the container can be constructed to have a single layered structure, a multi-layered structure, or coated. Coating the temporary container can also reduce the tendency of the container sticking to the manufacturing equipment, especially during the heat sealing step to seal the container. Due to its excellent oxygen and/or moisture barrier performance, the temporary container does not need to be placed in an inert atmosphere during the polymerization reaction to form the drag reducing agents. In addition, the temporary container can be conveniently removed when no longer needed using a polar solvent that selectively dissolves the container material but not the polyolefin drag reducing agent. The container removal process can be accelerated when an acid or a base catalyst is used together with the polar solvent at elevated temperatures.

Suitable container materials are those that are dissolvable in water and/or a polar solvent, and are capable of forming a film. Examples of container materials include an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene glycol, a polysaccharide or its derivative, or a combination comprising at least one of the foregoing. Examples of polysaccharide and polysaccharide derivative include chitin, chitosan, chemically modified cellulose, and a chemically modified starch. As used herein, chemically modified cellulose and chemically modified starch refer to cellulose or starch which have been chemically treated such that the modified material is dissolvable in water and/or a polar solvent, and is capable of forming a film. Examples of chemically modified starch include starch acetate. Examples of chemically modified cellulose include cellulose acetate and cellulose triacetate. Polyethylene glycol is also known as polyethylene oxide (PEO) or polyoxyethylene (POE). As used herein, polyethylene glycol can have a molecular weight of up to 7,000,000. More than one container materials can be used. In an embodiment the container material comprises an ethylene vinyl alcohol copolymer. The copolymer can contain about 10 to about 80 mol % of units derived from ethylene (ethylene units), and about 90 to about 20 mol % of units derived from vinyl alcohol (vinyl alcohol units), each based on the sum of the moles of the ethylene units and the vinyl alcohol units. In a continuous process, the container materials can be provided as a continuous sheet, which is sealed by heat or adhesive to fabricate temporary containers of predetermined dimensions. The containers may have different shapes such as sphere, cylinder, cube, and irregular shapes. Their dimensions are larger than 1000 microns, preferably between 1 centimeter to 100 centimeters.

The temporary container can have a single layered structure or a multi-layered structure. A single layer structure means that the temporary container has only one layer, and that layer is made from the container material as disclosed herein. A multi-layered structure means that the temporary container has two or more layers, wherein at least one layer is made from the container material as disclosed herein. Without wishing to be bound by theory, it is believed that when the temporary container is constructed with multiple layers of different materials, its oxygen and/or moisture barrier performance can be further improved, and dissolution of the container material can be fine-tuned.

Co-extrusion or other methods known in the art can be used to produce temporary containers having a multi-layered structure. In a temporary container having a multi-layered structure, the layer that faces the drag reducing agent or the reaction mixture used to form the drag reducing agent is referred to as an inner layer, and the layer defines the exterior of the temporary container is referred to as an outer layer. The layer that includes the container material as disclosed herein can be an inner layer or an outer layer of the temporary container. In an embodiment, each layer of the multi-layer structure independently comprises a container material as disclosed herein.

The temporary container can have a wall thickness of about 1 to about 2000 microns, preferably about 20 to about 100 microns.

Optionally the temporary container can be coated with wax, a silicone, or a combination comprising at least one of the foregoing. The wax can be a natural wax or a synthetic wax. Examples of suitable naturally occurring wax materials include beeswax, candelilla wax, carnauba wax, ozokerite wax, ceresine wax, and montan wax. Synthetic waxes include paraffin waxes, and polymers under the tradenames VYBAR™ and POLYWAX™ from Baker Hughes a GE company, LLC. As used herein, silicone includes silicone oils. In an embodiment, the silicone in the coating is polydimethylsiloxane (PDMS).

The coating can be disposed on an inner surface of the container, an outer surface of the container, or both the inner surface and the outer surface of the container. As used herein, an inner surface of the container means the surface that would otherwise be in direct physical contact with the drag reducing agent, or the reaction mixture to produce the drag reducing agent when the coating is not present. The outer surface refers to a surface that is opposed to the inner surface. The coating material can be sprayed onto the inner and/or outer surfaces of the temporary container in situ during a continuous process.

As used herein, drag reducing agent forming components include at least one olefin monomer, or at least one olefin oligomer, or a combination thereof. Exemplary olefin monomers are alpha olefin monomers having a structure represented by Formula (I):

Formula (I)

wherein $R_1$ is a $C_{2-25}$ or $C_{4-20}$ alkyl group. Olefin oligomers include oligomers derived from olefin monomers of Formula (I) and can have a weight average molecular weight of less than about 5,000 Daltons or less than about 3,000 Daltons as determined by a gel permeation chromatography (GPC) method.

The drag reducing agents can be copolymers comprising units derived from olefin monomers/oligomers and units derived from vinylalkylene carboxylic ester monomers/oligomers. Such copolymers can have a structure represented by Formula (II):

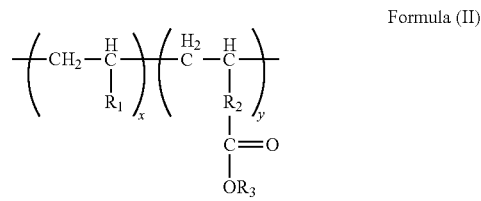

Formula (II)

wherein $R_1$ is as defined in Formula (I), and $R_2$ and $R_3$ are each independently a $C_{1-25}$ alkyl, x is about 50,000 to about 20,000,000, and y is about 50,000 to about 20,000,000. The ratio of y to x can be from about 0.0001 to about 0.99, preferably from about 0.0001 to 0.2.

To make the copolymers, the drag reducing agent forming components further include at least one vinylalkylene carboxylic ester monomer having the Formula (III), or at least one vinylalkylene carboxylic ester oligomer, or a combination thereof:

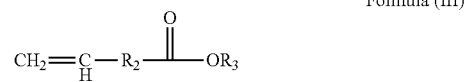

Formula (III)

wherein $R_1$ is as defined in Formula (I), and $R_2$ and $R_3$ are as defined in Formula (II). The vinylalkylene carboxylic ester oligomers can have a weight average molecular weight of less than about 5,000 Daltons or less than about 3,000 Daltons as determined by a gel permeation chromatography (GPC) method.

The polyolefin drag reducing agents can be synthesized via a bulk polymerization process from the drag reducing agent forming components. As used herein, a bulk polymerization refers to a polymerization reaction that is carried out in the absence of any solvent or dispersant.

During the process, the drag reducing agent forming components and catalysts can be injected into the temporary containers. Catalysts that can be used include Ziegler-Natta catalysts as described in U.S. Pat. No. 6,649,670. Exemplary catalysts include, but are not necessarily limited to, aluminum activated titanium trichloride ($TiCl_3AA$), diethylaluminum chloride (DEAC), diethylaluminum ethoxide (DEALE), triethyl aluminum chloride (TEAL), tri-methyl aluminum, tri-isobutyl aluminum, methylaluminoxane (MAO) and the like. Co-catalysts known in the art can also be used.

The catalysts and the drag reducing agent forming components such as monomers and/or oligomers thereof as described herein can be premixed first then injected into the temporary containers. In an embodiment, the drag reducing agent forming components and the catalysts are charged into at least one or a series of continuous stirred tank reactors, where the monomers are allowed to at least partially react forming oligomers having an adequate molecular weight or viscosity before injected into the temporary containers. Alternatively the catalysts and the drag additive agent forming components are separately added to the temporary containers.

Once charged with the drag reducing agent forming components which contain monomers, oligomers, or a combination thereof and catalysts, the temporary containers are sealed. A "form, fill, and seal" packaging device can be used. For polymerization reactions that are sensitive to oxygen and/or moisture, the fill and seal can be conducted under an inert atmosphere.

The sealed temporary containers are placed in an environment that is effective to remove the heat generated from the polymerization reaction. The environment can be an inert environment. Advantageously, the container material can be selected and constructed to be an excellent oxygen and/or moisture barrier such that oxygen and/or moisture in the ambient environment do not diffuse into the temporary containers while the olefin components are polymerized therein. Thus the environment does not necessary have to be an inert environment, and oxygen and/or moisture can be present around the sealed temporary container during the polymerization reaction.

The environment can be a liquid bath comprising a heat transfer fluid. Heat transfer fluids can include a hydrocarbon such as an aromatic solvent, an alcohol, or a combination comprising at least one of the foregoing. Exemplary heat transfer fluids include toluene, xylene, propanol, octanol, glycol such as hexylene glycol and ethylene glycol, isoparaffinic hydrocarbons such as ISOPAR™ fluids available from ExxonMobil, other synthetic hydrocarbons such as THERMINOL™ D-12 heat transfer fluid and THERMINOL™ VLT heat transfer fluid available from EASTMAN, or a combination comprising at least one of the foregoing. Optionally the liquid bath is agitated or circulated to improve heat transfer efficiency.

Alternatively or in addition, the environment can include circulated gas such as circulated air, nitrogen, carbon dioxide, argon, and the like to improve heat transfer efficiency at −100° C. to 100° C., preferably, at −40° C. to 20° C.

The sealed temporary containers can be placed in a liquid bath or a circulated gas environment at −100° C. to 100° C. for 0.1 to 200 hours to allow the drag reducing agent forming components to polymerize. Preferably the sealed temporary containers are placed in an environment at about −40° C. to about 20° C. for about 1 hour to about 24 hours.

After the drag reducing agent forming components inside the temporary containers reach a certain conversion percent and/or the polymerization product reaches a certain conversion or a certain molecular weight, the temporary containers are removed. In an embodiment, greater than about 70 wt % or greater than about 80 wt % of the drag reducing agent forming components are polymerized. The desired weight average molecular weight of the polymerized product can be greater than or equal to about 1,000,000 Daltons, for example, about 10,000,000 to about 30,000,000 Daltons. The molecular weight of the polymerized product is estimated by the inherent viscosity. Methods of estimating molecular weight with inherency viscosity are known and have been described in U.S. Pat. No. 5,449,732, and Production Chemicals for the Oil and Gas Industry ($2^{nd}$ Edition) by Malcolm A. Kelland.

The temporary containers can be either fully or partially removed by at least dissolving the container material in a polar solvent. Advantageously, the polar solvent only selectively dissolves the container material but not the polyolefin drag reducing agents. Exemplary polar solvents include methanol, ethanol, propanol, hexanol, octanol, hexylene glycol, water, or a combination comprising at least one of the foregoing. Water can be in the form of steam.

Optionally the container material is dissolved in the presence of an acid or base catalyst. Exemplary acid catalysts include acetic acid, p-toluenesulfonic acid, carbonic acid, $CO_2$, HCl, $H_2SO_4$, $H_3PO_4$, or a combination comprising at least one of the foregoing. Exemplary base catalysts include NaOH, KOH, $Na_2CO_3$, $K_2CO_3$, ammonia, $NaHCO_3$, $KHCO_3$, or a combination comprising at least one of the foregoing. When an acid or base catalyst is used, the container material can be dissolved at a much faster rate. If desired, a rinse process with alcohols such as methanol, ethanol, propanol, hexanol, octanol, hexylene glycol, and/or water or a neutralization process can be used to remove the residual acid/base catalysts after the container material is dissolved. Any neutralization process known to a person skilled in the art can be used. For example, one can use an acid to neutralize a base and use a base to neutralize an acid.

As used herein, dissolving the container material includes decomposing the container material and dissolving the decomposed material in the polar solvent. One of the exemplary decomposing processes includes hydrolyzing the container material in water. Dissolving the container material also includes the embodiments where the container material is dissolved without degradation. Advantageously, air, oxygen, and/or water may be added to the polar solvent to terminate the polymerization while the container material is dissolved.

The temperature of the polar solvent used to dissolve the container material is not particularly limited, and can be about −100° C. to about 200° C. or about 20° C. to about 200° C.

The high molecular weight drag reducing agents synthesized via a bulk polymerization process typically need to be ground to form particles before they can be blended with a dispersing fluid to form a dispersion. FIG. 1 is a flow chart illustrating an exemplary process of making a polyolefin drag reducing agent where the container material is at least partially dissolved before grinding. Optionally the polyolefin drag reducing agent is separated from the polar solvent after the container material is dissolved.

Before the grinding, during the grinding or during the dispersing process, air, oxygen, or water may be added to terminate the polymerization. Water can be in the form of steam.

Figure 2:
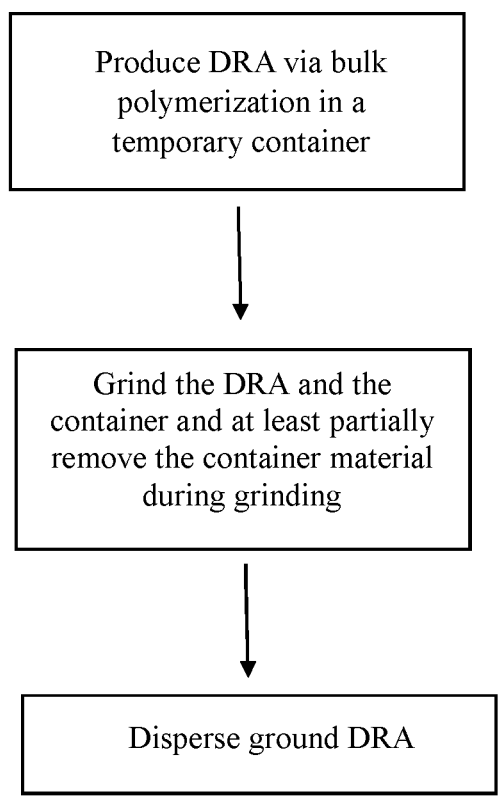
FIG. 2 is a process diagram showing another exemplary process of making a polyolefin drag reducing agent where the container material is at least partially dissolved during grinding.

Grinding can be conducted under cryogenic grinding conditions or non-cryogenic grinding conditions. In an embodiment, the drag reducing agent is ground under non-cryogenic grinding conditions. Solid and liquid grinding aids, such as those described in U.S. Pat. No. 6,946,500, can be used in a non-cryogenic grinding. In an embodiment, the container together with the polyolefin drag reducing agent are ground together in the presence of the polar solvent, optionally also in the presence of a base or acid catalyst. Thus, the container material can be at least partially dissolved in the polar solvent during grinding. The process is illustrated in FIG. 2. The base or acid catalyst, if present, can be rinsed or neutralized.

The particulate drag reducing agent can be dispersed in a dispersing fluid to produce slurries or dispersions, which are stored, shipped, and used in various applications. Advantageously, the polar solvent is not separated from the particulate drag reducing agent. Thus the polar solvent and the dissolved container material can be in the final slurries or dispersions that suspend the particulate drag reducing agent.

Figure 3:
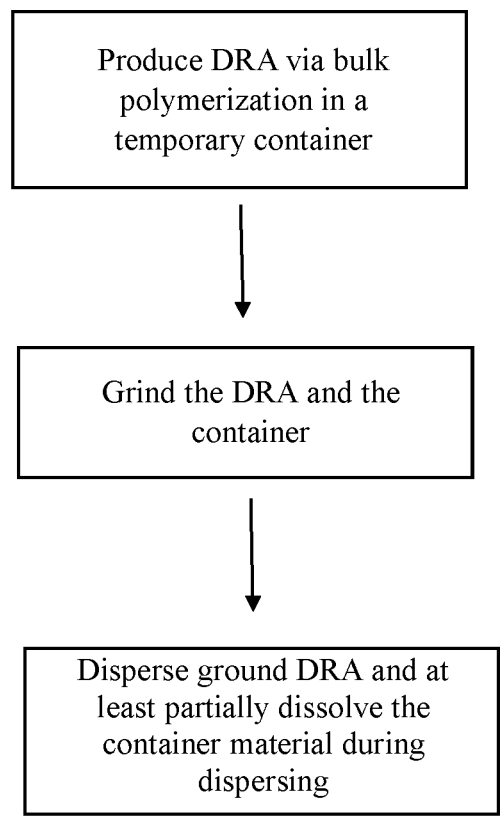
FIG. 3 is a process diagram showing yet another exemplary process of making a polyolefin drag reducing agent where the container material is at least partially dissolved while dispersing the ground polyolefin drag reducing agent to form a dispersion.

The dispersing fluid can contain a polar solvent as disclosed herein such as hexanol, propanol, octanol, a glycol such as hexylene glycol, water, or a combination comprising at least one of the foregoing. Thus optionally the container material, if not removed previously, can also be dissolved in the dispersing fluid. An acid or base catalyst as disclosed herein can be used. After the container material is dissolved, the acid or base catalyst can be neutralized. Such a process is illustrated in FIG. 3. In this embodiment, the dissolved container material can become part of the final dispersion formulation.

Set forth below are various embodiments of the disclosure.

Embodiment 1

A process of manufacturing a polyolefin drag reducing agent comprising: injecting a catalyst and a drag reducing agent forming component comprising (i) at least one olefin monomer, or (ii) at least one olefin oligomer, or a combination of (i) and (ii) into a temporary container comprising a container material, which includes an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene glycol, a polysaccharide or its derivative, or a combination comprising at least one of the foregoing; sealing the temporary container; allowing the drag reducing agent forming component to polymerize in the sealed temporary container to form the polyolefin drag reducing agent; and at least partially dissolving the container material with a polar solvent that selectively dissolves the container material but not the polyolefin drag reducing agent, provided that when the container material comprises polyvinyl acetate or polyvinyl alcohol, the temporary container is coated or has two or more layers.

Embodiment 2

The process as in any prior embodiment, wherein the temporary container has two or more layers, and at least one layer comprises the container material.

Embodiment 3

The process as in any prior embodiment, wherein each of the at least two or more layers independently comprises the container material.

Embodiment 4

The process as in any prior embodiment, wherein the temporary container has an inner surface and an opposing outer surface, and a coating is disposed on at least one of the inner and outer surfaces of the temporary container, the coating comprising a wax, a silicone, or a combination comprising at least one of the foregoing.

Embodiment 5

The process as in any prior embodiment, further comprising continuously forming the temporary container from a sheet of the container material.

Embodiment 6

The process as in any prior embodiment, wherein the polar solvent comprises methanol, ethanol, propanol, hexanol, octanol, hexylene glycol, water, or a combination comprising at least one of the foregoing.

Embodiment 7

The process as in any prior embodiment, wherein the container material is dissolved at a temperature of about −100° C. to about 200° C.

Embodiment 8

The process as in any prior embodiment, wherein the container material is dissolved in the presence of the acid or base catalyst.

Embodiment 9

The process as in any prior embodiment, wherein the acid catalyst comprises acetic acid, p-toluenesulfonic acid, carbonic acid, $CO_2$, HCl, $H_2SO_4$, $H_3PO_4$, or a combination comprising at least one of the foregoing; and the base catalyst comprises NaOH, KOH, $Na_2CO_3$, $K_2CO_3$, ammonia, $NaHCO_3$, $KHCO_3$, or a combination comprising at least one of the foregoing.

Embodiment 10

The process as in any prior embodiment, further comprising removing the acid or base catalyst by rinsing the polyolefin drag reducing agent after the container material is at least partially dissolved.

Embodiment 11

The process as in any prior embodiment, further comprising neutralizing the acid or base catalyst after the container material is at least partially dissolved.

Embodiment 12

The process as in any prior embodiment, further comprising grinding the polyolefin drag reducing agent to produce a particulate polyolefin drag reducing agent.

Embodiment 13

The process as in any prior embodiment, wherein the container material is at least partially dissolved before grinding.

Embodiment 14

The process as in any prior embodiment, wherein the grinding is conducted in the presence of the polar solvent, and the container material is at least partially dissolved during grinding.

Embodiment 15

The process as in any prior embodiment, further comprising dispersing the particulate polyolefin drag reducing agent in a dispersing fluid.

Embodiment 16

The process as in any prior embodiment, wherein the dispersing fluid comprises the polar solvent, and the container material is at least partially dissolved in the polar solvent during dispersing.

Embodiment 17

The process as in any prior embodiment, wherein the sealed temporary container is placed in an environment that is effective to remove heat generated from a polymerization reaction of the drag reducing agent forming component away from the temporary container.

Embodiment 18

The process as in any prior embodiment, wherein the environment comprises a heat transfer fluid that is a hydrocarbon, an organic solvent, an alcohol, or a combination comprising at least one of the foregoing.

Embodiment 19

The process as in any prior embodiment, wherein the heat transfer fluid comprises toluene, xylene, propanol, octanol, hexylene glycol, ethylene glycol isoparaffinic hydrocarbon, a combination comprising at least one of the foregoing.

Embodiment 20

The process as in any prior embodiment, wherein the heat transfer fluid is agitated or circulated.

Embodiment 21

The process as in any prior embodiment, wherein the environment comprises oxygen; and the container material is selected such that oxygen is not diffused into the sealed temporary container while the olefin component is polymerized in the sealed temporary container.

Embodiment 22

The process as in any prior embodiment, wherein the drag reducing agent forming component is polymerized in the sealed temporary container without using a solvent.

Embodiment 23

The process as in any prior embodiment, wherein the drag reducing agent forming component further comprises a vinylalkylene carboxylic ester having the Formula (II), an oligomer of the vinylalkylene carboxylic ester, or a combination thereof, wherein $R_1$ is a $C_{2-25}$ alkyl, and $R_2$ and $R_3$ are each independently a $C_{1-25}$ alkyl.

Embodiment 24

The process as in any prior embodiment, wherein the process is a continuous process, a batch process, or a semi-continuous process.

Embodiment 25

A process of manufacturing an olefin drag reducing agent comprising: continuously forming a temporary container from a container material comprising an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene glycol, a polysaccharide or its derivative, or a combination comprising at least one of the foregoing; injecting a catalyst and a drag reducing agent forming component into the temporary container, the drag reducing agent forming component comprising (i) at least one olefin monomer, or (ii) at least one olefin oligomer, or a combination of (i) and (ii); sealing the temporary container; placing the sealed temporary container in a heat transfer fluid at −100 to 100° C. for about 0.1 to about 200 hours to allow the drag reducing agent forming component to polymerize in the sealed temporary container forming the polyolefin drag reducing agent; removing the sealed temporary container from the heat transfer fluid; grinding the polyolefin drag reducing agent to produce a particulate polyolefin drag reducing agent; dispersing the particulate polyolefin drag reducing agent in a dispersing fluid, and at least partially dissolving the container material with a polar solvent that selectively dissolves the container material but not the polyolefin drag reducing agent after the polyolefin drag reducing agent is formed; provided that when the container material comprises polyvinyl acetate or polyvinyl alcohol, the temporary container is coated or has two or more layers.

Embodiment 24

The process as in any prior embodiment, wherein container material is at least partially dissolved before the grinding, during the grinding, during the dispersing, or a combination thereof.

Embodiment 25

The process as in any prior embodiment, wherein the container material is dissolved at a temperature of about −100° C. to about 200° C.

Embodiment 26

The process as in any prior embodiment, wherein the polar solvent comprises methanol, ethanol, propanol, hexanol, octanol, hexylene glycol, water, or a combination comprising at least one of the foregoing.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A process of manufacturing a polyolefin drag reducing agent, the process comprising:
    injecting a catalyst and a drag reducing agent forming component comprising (i) at least one olefin monomer, or (ii) at least one olefin oligomer, or a combination of (i) and (ii) into a temporary container comprising a container material, which includes an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, a polysaccharide or its derivative, or a combination comprising at least one of the foregoing;
    sealing the temporary container;
    allowing the drag reducing agent forming component to polymerize in the sealed temporary container to form the polyolefin drag reducing agent; and
    at least partially dissolving the container material with a polar solvent that selectively dissolves the container material but not the polyolefin drag reducing agent, provided that when the container material comprises polyvinyl acetate or polyvinyl alcohol, the temporary container is coated or has two or more layers.

2. The process of claim 1, wherein the temporary container has two or more layers, and at least one layer comprises the container material.

3. The process of claim 2, wherein each of the two or more layers independently comprises the container material.

4. The process of claim 1, wherein the temporary container has an inner surface and an opposing outer surface, and a coating is disposed on at least one of the inner and outer surfaces of the temporary container, the coating comprising a wax, a silicone, or a combination comprising at least one of the foregoing.

5. The process of claim 1, further comprising continuously forming the temporary container from a sheet of the container material.

6. The process of claim 1, wherein the polar solvent comprises methanol, ethanol, propanol, hexanol, octanol, hexylene glycol, water, or a combination comprising at least one of the foregoing.

7. The process of claim 1, wherein the container material is dissolved at a temperature of about −100° C. to about 200° C.

8. The process of claim 1, wherein the container material is dissolved in the presence of the acid or base catalyst.

9. The process of claim 8, wherein the acid catalyst comprises acetic acid, p-toluenesulfonic acid, carbonic acid, $CO_2$, HCl, $H_2SO_4$, $H_3PO_4$, or a combination comprising at least one of the foregoing; and the base catalyst comprises NaOH, KOH, $Na_2CO_3$, $K_2CO_3$, ammonia, $NaHCO_3$, $KHCO_3$, or a combination comprising at least one of the foregoing.

10. The process of claim 8, further comprising removing the acid or base catalyst by rinsing the polymer drag reducing agent after the container material is at least partially dissolved.

11. The process of claim 8, further comprising neutralizing the acid or base catalyst after the container material is at least partially dissolved.

12. The process of claim 1, further comprising grinding the polyolefin drag reducing agent to produce a particulate polyolefin drag reducing agent.

13. The process of claim 12, wherein the container material is at least partially dissolved before grinding.

14. The process of claim 12, wherein the grinding is conducted in the presence of the polar solvent, and the container material is at least partially dissolved during grinding.

15. The process of claim 12, further comprising dispersing the particulate polyolefin drag reducing agent in a dispersing fluid.

16. The process of claim 15, wherein the dispersing fluid comprises the polar solvent, and the container material is at least partially dissolved in the polar solvent during dispersing.

17. The process of claim 1, wherein the sealed temporary container is placed in an environment that is effective to remove heat generated from a polymerization reaction of the drag reducing agent forming component away from the temporary container.

18. The process of claim 17, wherein the environment comprises a heat transfer fluid that is a hydrocarbon, an organic solvent, an alcohol, or a combination comprising at least one of the foregoing.

19. The process of claim 18, wherein the heat transfer fluid comprises toluene, xylene, propanol, octanol, hexylene glycol, ethylene glycol isoparaffinic hydrocarbon, or a combination comprising at least one of the foregoing.

20. The process of claim 17, wherein the environment comprises oxygen; and the container material is selected such that oxygen is not diffused into the sealed temporary container while the olefin is polymerized in the sealed temporary container.

21. The process of claim 1, wherein the process is a continuous process, a semi-continuous process, or a batch process.

22. A process of manufacturing an olefin drag reducing agent, the process comprising:
    continuously forming a temporary container from a container material comprising an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene glycol, a polysaccharide or its derivative, or a combination comprising at least one of the foregoing;

injecting a catalyst and a drag reducing agent forming component into the temporary container, the drag reducing agent forming component comprising (i) at least one olefin monomer, or (ii) at least one olefin oligomer, or a combination of (i) and (ii);

sealing the temporary container;

placing the sealed temporary container in a heat transfer fluid or a circulated gas environment at −100 to 100° C. for about 0.1 to about 200 hours to allow the drag reducing agent forming component to polymerize in the sealed temporary container forming the polyolefin drag reducing agent;

removing the sealed temporary container from the heat transfer fluid;

grinding the polyolefin drag reducing agent to produce a particulate polyolefin drag reducing agent;

dispersing the particulate polyolefin drag reducing agent in a dispersing fluid, and at least partially dissolving the container material with a polar solvent that selectively dissolves the container material but not the polyolefin drag reducing agent after the polyolefin drag reducing agent is formed; provided that when the container material comprises polyvinyl acetate or polyvinyl alcohol, the temporary container is coated or has two or more layers.

* * * * *